United States Patent
Wang

(10) Patent No.: US 10,732,453 B2
(45) Date of Patent: Aug. 4, 2020

(54) DISPLAY PANEL AND METHOD OF MANUFACTURING THEREFOR, AND DISPLAY DEVICE

(71) Applicant: BOE TECHNOLOGY GROUP CO., LTD., Beijing (CN)

(72) Inventor: Yingtao Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 511 days.

(21) Appl. No.: 15/566,392

(22) PCT Filed: Apr. 25, 2017

(86) PCT No.: PCT/CN2017/081871
§ 371 (c)(1),
(2) Date: Oct. 13, 2017

(87) PCT Pub. No.: WO2017/202168
PCT Pub. Date: Nov. 30, 2017

(65) Prior Publication Data
US 2018/0210287 A1     Jul. 26, 2018

(30) Foreign Application Priority Data
May 27, 2016   (CN) .......................... 2016 1 0365052

(51) Int. Cl.
*G02F 1/1335*   (2006.01)
*G02F 1/1333*   (2006.01)
*G02F 1/13357*  (2006.01)

(52) U.S. Cl.
CPC .. *G02F 1/133528* (2013.01); *G02F 1/133345* (2013.01); *G02F 1/133512* (2013.01);
(Continued)

(58) Field of Classification Search
CPC ......... G02F 1/133528; G02F 1/133553; G02F 1/133602; G02F 1/133536;
(Continued)

(56) References Cited

U.S. PATENT DOCUMENTS 6,184,955 B1 * 2/2001 Okumura .......... G02F 1/133528
349/162
2006/0082706 A1   4/2006 Choo et al.
(Continued)

FOREIGN PATENT DOCUMENTS

| CN | 1763615 A   | 4/2006 |
| CN | 103185980 A | 7/2013 |

(Continued)

OTHER PUBLICATIONS

First Office Action issued in corresponding Chinese Patent Application No. 201610365052.8, dated Jun. 26, 2018; with English translation.
(Continued)

*Primary Examiner* — Hoan C Nguyen
(74) *Attorney, Agent, or Firm* — McDermott Will & Emery LLP

(57) ABSTRACT

The embodiments of the present disclosure relate to a display panel, a method of manufacturing therefor, and a display device. The display panel includes: a first substrate, a second substrate, and a liquid crystal layer disposed between the first substrate and the second substrate; a color film layer disposed on the side of the first substrate adjacent to the liquid crystal layer, the color film layer including a color filter layer, a black matrix, and a first reflector; a first polarizer and a second polarizer, which are respectively disposed on the first substrate and the second substrate; a light absorbing element disposed on the side of the second substrate away from the liquid crystal layer; and a backlight
(Continued)

source disposed below the second substrate. The display panel provided by the embodiments of the present disclosure has a better display effect in a bright environment and a dark environment.

16 Claims, 6 Drawing Sheets

(52) U.S. Cl.
CPC .. *G02F 1/133514* (2013.01); *G02F 1/133536* (2013.01); *G02F 1/133553* (2013.01); *G02F 1/133602* (2013.01); *G02F 2001/133548* (2013.01); *G02F 2001/133562* (2013.01); *G02F 2001/133567* (2013.01)

(58) Field of Classification Search
CPC ......... G02F 1/133514; G02F 1/133345; G02F 1/133512; G02F 2001/133567; G02F 2001/133548; G02F 2001/133562
See application file for complete search history.

(56) References Cited

U.S. PATENT DOCUMENTS

| | | | | |
|---|---|---|---|---|
| 2014/0049733 | A1* | 2/2014 | Suzuki | G02F 1/133514 349/96 |
| 2014/0140045 | A1* | 5/2014 | Sohn | G02F 1/133553 362/97.1 |
| 2015/0198833 | A1 | 7/2015 | Chung et al. | |
| 2017/0146832 | A1* | 5/2017 | Song | G02F 1/133536 |
| 2018/0149917 | A1 | 5/2018 | Wang et al. | |
| 2018/0239155 | A1* | 8/2018 | Wang | G02F 1/133514 |

FOREIGN PATENT DOCUMENTS

| | | |
|---|---|---|
| CN | 104570466 A | 4/2015 |
| CN | 104777659 A | 7/2015 |
| CN | 105446001 A | 3/2016 |
| CN | 105446042 A | 3/2016 |
| CN | 105807483 A | 7/2016 |
| CN | 105974648 A | 9/2016 |
| WO | 2016/080385 A1 | 5/2016 |

OTHER PUBLICATIONS

International Search Report issued in International Patent Application No. PCT/CN2017/081871, dated Aug. 1, 2017; with English translation.

Written Opinion of the International Searching Authority, issued in International Patent Application No. PCT/CN2017/081871, dated Aug. 1, 2017; with English translation.

* cited by examiner

DISPLAY PANEL AND METHOD OF MANUFACTURING THEREFOR, AND DISPLAY DEVICE

CROSS-REFERENCE TO RELATED APPLICATION

This application is the U.S. National Phase under 35 U.S.C. § 371 of International Patent Application No. PCT/CN2017/081871, filed on Apr. 25, 2017, which in turn claims priority to Chinese Patent Application No. 201610365052.8, filed on May 27, 2016, titled "DISPLAY PANEL AND MANUFACTURING METHOD THEREFOR, AND DISPLAY DEVICE", the entire disclosures of which Applications are incorporated by reference herein.

TECHNICAL FIELD

The present disclosure relates to the technical field of liquid crystal display, more particularly, to a display panel and a method of manufacturing therefor, and a display device.

BACKGROUND

Liquid crystal display technology is a mature technology, and liquid crystal display panels can be seen everywhere. The existing liquid crystal display panels include transmission display panels and reflection display panels.

The transmission display panel is provided with a backlight source which is disposed below the display panel, and the light emitted from the backlight source can achieve the bright and dark display of the display panel by rotatory action of liquid crystal molecules, in order to form the final image. Users can see a uniform brightness screen even in a dark case by using a transmission display panel. The image display of the reflection display panel is based on the reflection of light. The reflection display panel is provided with reflective material which is disposed below the liquid crystal display panel in replace of the backlight source of the transmission display panel. When the ambient light is sufficient, for example, in a sunny outdoor, the reflection display panel uses the reflective material to reflect the ambient light to illuminate the screen. This kind of reflective display panel can save energy.

SUMMARY

The embodiments of the present disclosure adopt the following technical solutions.

A first aspect of the disclosure provides a display panel, including: a first substrate and a second substrate, which are disposed opposite to each other, a liquid crystal layer disposed between the first substrate and the second substrate, a color film layer disposed on the side of the first substrate adjacent to the liquid crystal layer, the color film layer including a color filter layer, a black matrix, and a first reflector disposed on the side of the black matrix adjacent to the liquid crystal layer, a first polarizer and a second polarizer, which are respectively disposed on the first substrate and the second substrate, the second polarizer being configured to be able to reflect the light component whose polarization direction is perpendicular to the transmission axis of the second polarizer, and the position of the second polarizer corresponding to the position of the color filter layer, a light absorbing element disposed on the side of the second substrate away from the liquid crystal layer, the position of the light absorbing element corresponding to the position of the second polarizer, and a backlight source disposed below the second substrate.

In a possible implementation manner of the first aspect of the disclosure, the reflective surface of the first reflector is configured to be capable of diffusing the reflected light at different angles.

In another possible implementation manner of the first aspect of the disclosure, the reflective surface of the first reflector includes a plurality of protrusions or a plurality of depressions, and both a plurality of protrusions and a plurality of depressions.

In yet another possible implementation manner of the first aspect of the disclosure, the second polarizer is a wire grid polarizer.

In yet another possible implementation manner of the first aspect of the disclosure, the first polarizer is located between the first substrate and the color film layer; the second polarizer is located on the side of the second substrate adjacent to the liquid crystal layer.

In yet another possible implementation manner of the first aspect of the disclosure, the display panel further includes a second reflector disposed on the light absorbing element.

In yet another possible implementation manner of the first aspect of the disclosure, the display panel further includes an insulating layer disposed on the second polarizer, and a thin film transistor array disposed on the insulating layer.

In yet another possible implementation manner of the first aspect of the disclosure, the display panel further includes an overcoat disposed on the side of the color film layer adjacent to the liquid crystal layer.

A second aspect of the disclosure provides a manufacturing method of manufacturing the display panel, including: providing a first substrate, forming a first polarizer on the first substrate, forming a color film layer on the first polarizer, the color film layer including a color filter layer, a black matrix, and a first reflector formed on the black matrix, providing a second substrate, forming a second polarizer on one side of the second substrate, the second polarizer being configured to be capable of reflecting the light component whose polarization direction is perpendicular to the transmission axis of the second polarizer, and the position of the second polarizer on the second substrate corresponding to the position of the color filter layer on the first substrate, forming a light absorbing element in a position on the other side of the second substrate corresponding to the second polarizer, jointing the first substrate to the second substrate with a liquid crystal layer therebetween, so that the color film layer and the second polarizer are facing the liquid crystal layer, and providing a backlight source on the side of the second substrate away from the liquid crystal layer.

In a possible implementation manner of the first aspect of the disclosure, the reflective surface of the first reflector is configured to be capable of diffusing the reflected light at different angles.

In another possible implementation manner of the first aspect of the disclosure, the reflective surface of the first reflector includes a plurality of protrusions or a plurality of depressions, and both a plurality of protrusions and a plurality of depressions.

In yet another possible implementation manner of the first aspect of the disclosure, the second polarizer is a wire grid polarizer.

In yet another possible implementation manner of the first aspect of the disclosure, after forming the light absorbing element, the method further includes: forming a second reflector on the light absorbing element.

In yet another possible implementation manner of the first aspect of the disclosure, after forming the second polarizer, the method further includes: forming an insulating layer on the second polarizer, and forming a thin film transistor array on the insulating layer.

In yet another possible implementation manner of the first aspect of the disclosure, after forming the color film, the method further includes: forming an overcoat on the color film.

A third aspect of the disclosure provides a display device, including a display panel as described in the above embodiments.

Further aspects and ranges of the disclosure are apparent from the description provided herein. It should be understood that each aspect of the various aspects of the present application may be implemented individually or in combination with one or more other aspects of the various aspects of the present application. It should also be understood that the description and specific embodiments herein are used to illustrate only, but not to limit the scope of the present application.

BRIEF DESCRIPTION OF THE DRAWINGS

The drawings described herein are used to illustrate the chosen embodiments only, but not to illustrate all possible embodiments and limit the scope of the present application.

In the accompanying drawings.

DETAILED DESCRIPTION

In order to clear the purpose, the technical solutions and the advantages of the present disclosure, the present disclosure will be described fully with reference to the accompanying drawings.

The embodiments of the present disclosure provides a display panel and a method of manufacturing therefor, and a display device, so that the display panel and the display device can have a better display effect in a bright environment and a dark environment.

As already described above, the advantage of the transmission display panel is that users can see a uniform brightness screen even in a dark case. However, this kind of transmission display panel need to open the backlight source even in a bright environment, resulting in energy waste. In addition, in the environment of strong ambient light, due to strong light irradiation, the screen display may be not clear. In contrast, the reflection display panel has the advantage of saving energy. However, when in a dark environment (such as indoors or at night), the faint ambient light is not enough to illuminate the screen after being reflected back. Therefore, this reflection display panel has a strong dependence on intensity of ambient light, and the use of places are limited.

The embodiments of the present disclosure provides a display panel and a manufacturing method therefor, and a display device, so that the display panel and the display device can have a better display effect in a bright environment and a dark environment.

Device

Figure 1:
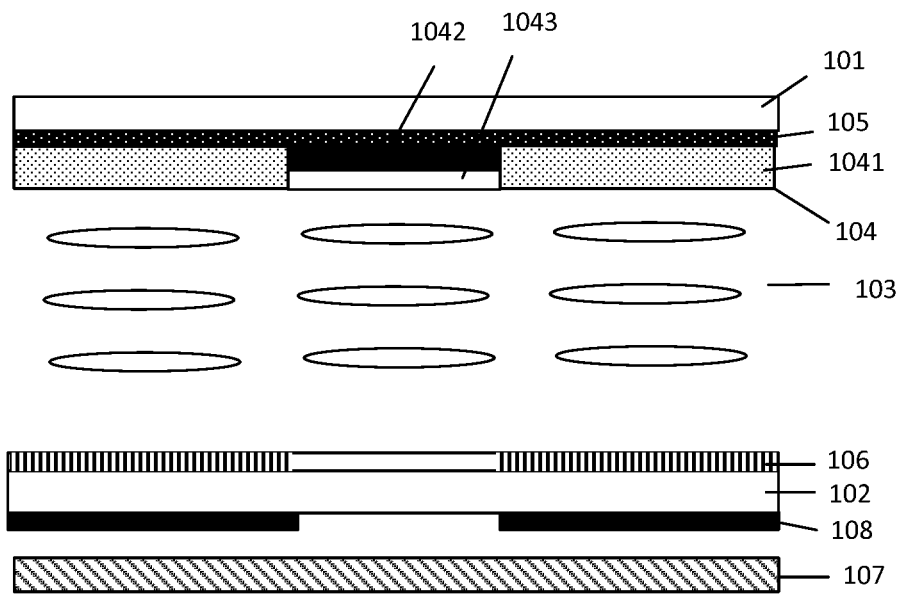
FIG. 1 schematically shows a cross-sectional view of one kind of the display panel provided by the embodiments.

FIG. 1 schematically shows a cross-sectional view of one kind of the display panel provided by the embodiments.

As shown in FIG. 1, a display panel includes a first substrate 101, a second substrate 102, a liquid crystal layer 103, a color film layer 104, a first polarizer 105, a second polarizer 106, a backlight source 107, and a light absorption element 108. The first substrate 101 and the second substrate 102 are disposed opposite to each other. The liquid crystal layer 103 is located between the first substrate 101 and the second substrate 102. The color film layer 104 is disposed on the side of the first substrate 101 adjacent to the liquid crystal layer 103, and the color film layer 104 includes a color filter layer 1041, a black matrix 1042, and a first reflector 1043 is disposed on the side of the black matrix adjacent to the liquid crystal layer 103. The first polarizer 105 and the second polarizer 106 are respectively disposed on the first substrate 101 and the second substrate 102, and the second polarizer 106 is configured to be able to reflect the light component whose polarization direction is perpendicular to the transmission axis of the second polarizer 106. The position of the second polarizer 106 corresponds to the position of the color filter layer 1041. The light absorbing element 108 is disposed on the side of the second substrate 102 away from the liquid crystal layer 103, and the position of the light absorbing element 108 corresponds to the position of the second polarizer 106. The backlight source 107 is disposed below the second substrate 102.

It is known that the first polarizer 105 and the second polarizer 106 are able to transmit the light component whose polarization direction is parallel to the transmission axis of the first polarizer 105 and the second polarizer 106 respectively.

In the embodiments described herein, optionally, the first substrate 101 and the second substrate 102 are transparent substrates. The color filter layer 1041 includes red (R) filter layer, green (G) filter layer, and blue (B) filter layer for filtering, in order to form three primary colors (R, G, B) for color display of the display device. The black matrix 1042 is an opaque portion deposited between any patterns of the color filter layer 1041. The main role of the black matrix 1042 is to prevent light leakage, improve display contrast, prevent color mixing and increase the purity of color. The positional relationship between the color filter layer 1041 and the black matrix 1042, and the fabrication process of the color filter layer 1041 and the black matrix 1042 are well known in the art, which the present embodiment will not elaborate.

In the embodiments described herein, the first reflector 1043 is disposed on the opaque black matrix 1042, which is configured to reflect light emitted from the backlight source to the liquid crystal layer 103 located in the pixel region around the first reflector 1043, in order to utilize the light emitted from the backlight for display the display panel. The first reflector 1043 can be a reflective layer directly coated on the surface of the black matrix 1042, or the reflective layer coated on a substrate, and the substrate can be disposed on the surface of the black matrix 1042.

Figure 2A:
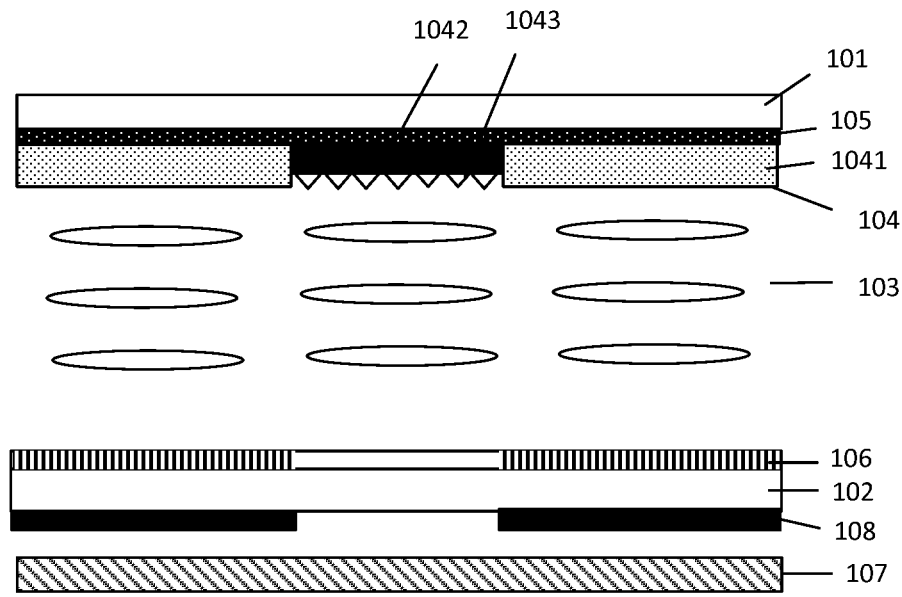
FIG. 2A and FIG. 2B schematically show cross-sectional views of other two kind of display panel provided by the embodiments, wherein the first reflector in FIG. 2A and the first reflector in FIG. 2B have a serrated reflective surface and a corrugated reflective surface, respectively.
Figure 2B:
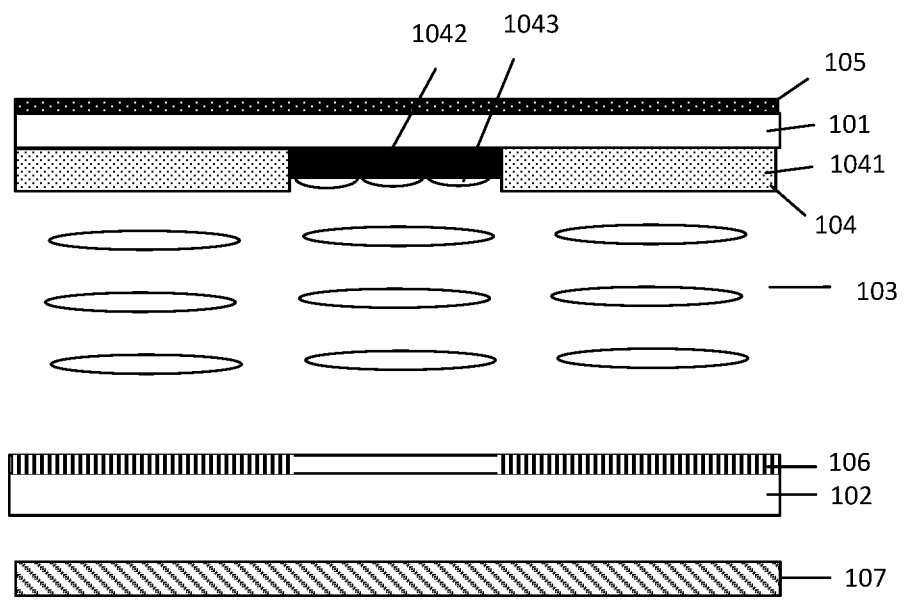

In order to make the first reflector 1043 able to relatively and uniformly reflect the light into the liquid crystal layer 103, the reflective surface of the first reflector 1043 can be configured to be capable of diffusing the reflected light at different angles, which means that, the light incident on the first reflector 1043 can be reflected into the liquid crystal layer 103 at different angles. In a particular embodiment, a plurality of protrusions or a plurality of recesses can be disposed on the reflective surface of the first reflector 1043. For example, the reflective surface shape of the first reflector 1043 can be set as a saw tooth shape as shown in FIG. 2A or a wavy shape as shown in FIG. 2B. In one example, a plurality of diffusion points can be formed on the reflective surface of the first reflector 1043 by a similar way with that of forming the web dot on the light guide plate of a backlight source. Each of these diffusion points can be convex shape or recessed shape and is configured to diffuse light incident on the corresponding diffusion point in all directions. Since the processing of forming the web dot on the light guide plate is well known in the art, the present embodiment will not elaborate it. Of course, the reflective surface shape of the first reflector 1043 can also be formed in other ways, for example, by means of a patterning process to form a reflective surface with protrusions and/or depressions.

The first polarizer 105 can be any conventional type of optical element which is capable of converting natural light into transmitted polarized light. For example, the first polarizer 105 can be an iodine series polarizer, which is capable of passing one of the polarized components of the incident light while the other polarization component is absorbed.

The second polarizer 106 can be any type of optical element which is capable of reflecting the light component whose polarization direction is perpendicular to the transmission axis of the second polarizer 106, and transmitting the light component whose polarization direction is parallel to the transmission axis of the second polarizer 106. For example, the second polarizer 106 can be a wire grid polarizer. The direction of the transmission axis of the wire grid polarizer is perpendicular to the direction of the wire. When the light is incident on the wire grid polarizer, the light of the electric field vector component which is parallel to the wire is reflected in the influence of the vibrating action of the free electrons of the metal surface, and the light of the electric field vector component which is perpendicular to the wire is transmitted.

It can be understood that both the first polarizer 105 and the second polarizer 106 can be wire grid polarizers.

In an optional embodiment, the first polarizer 105 can be disposed between the first substrate 101 and the color film layer 104 (as shown in FIG. 1 and FIG. 2A). The second polarizer 106 can be disposed on the side of the second substrate 102 adjacent to the liquid crystal layer 103 (as shown in FIG. 1, FIG. 2A and FIG. 2B). That means, the first polarizer 105 and the second polarizer 106 are disposed on the inner side of the first substrate 101 and the second substrate 102 respectively. This kind of configuration can not only reduce L0mura bad problems of the display panel, but also reduce the light leakage further. It can be understood that the first polarizer 105 and the second polarizer 106 can also be disposed on the outer side of the first substrate 101 and the second substrate 102 respectively. For example, in FIG. 2B, the first polarizer 105 is located above (outside of) the first substrate 101.

As shown in FIG. 1, FIG. 2A and FIG. 2B, the second polarizer 106 does not completely cover the second substrate 102, the second polarizer 106 is only disposed at a position corresponding to the position of the color filter layer 1041. That means, the second polarizer 106 is not disposed at a position corresponding to the first reflector 1043, but a notch region is provided which is configured to let the light emitted from the backlight source 107 pass and enter the liquid crystal layer 103. In one embodiment, the notch can be filled with some transparent material such that the layer where the second polarizer 106 resides is relatively flat.

The light absorption element 108 is disposed on the side of the second substrate 102 away from the liquid crystal layer 103. With this configuration, on the one hand, the light transmitted from the second polarizer 106 can be absorbed by the light absorbing element 108, in order to prevent light from leaking from the back surface of the display panel; on the other hand, the light absorbing element 108 can absorb the light emitted directly from the backlight source 107, in order to prevent light from passing through the second polarizer 106 toward the liquid crystal layer 103 and affecting the normal display. Optionally, the light absorbing element 108 can be made of the same material as the black matrix 1042.

In the embodiments described herein, the backlight source 107 can be any type of backlight source for a liquid crystal display, such as a side light type backlight source and a direct type backlight source.

The operation principle of the display panel in the embodiments of the present disclosure will be described in detail with reference to the always bright display panel and in conjunction with FIG. 3 to FIG. 6. In this embodiment, the direction of the transmission axis of the first polarizer 105 is parallel to the Y-axis direction in the XYZ coordinate system, and the direction of the transmission axis of the second polarizer 106 (perpendicular to the direction of the wire) is perpendicular to X-axis direction in the XYZ coordinate system. The term "always bright display panel" refers to a display panel which is in a bright state when no voltage is applied.

Figure 3:
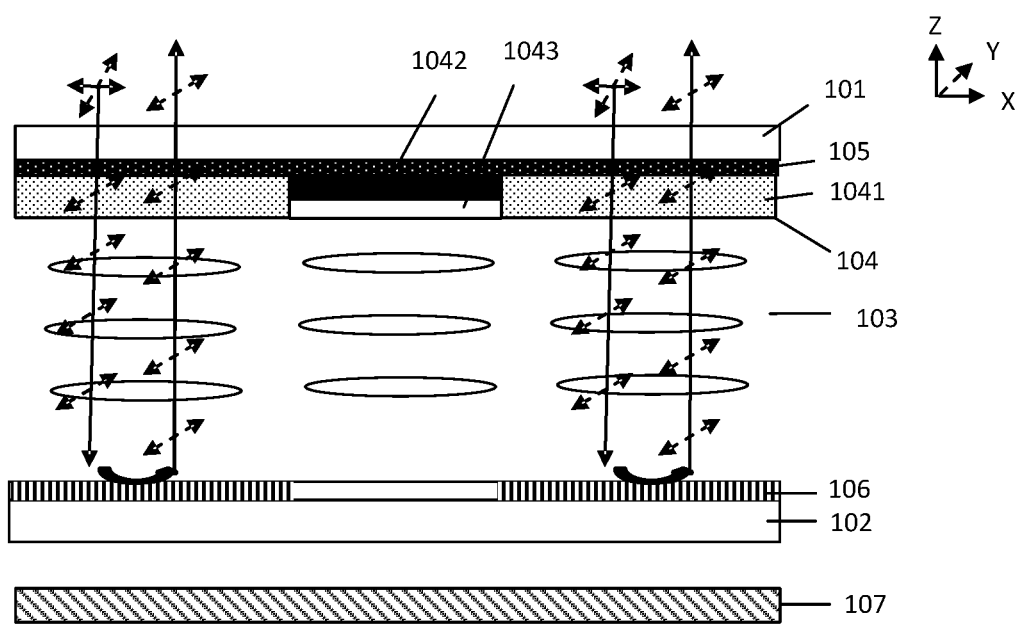
FIG. 3 schematically shows an optical path diagram of a display panel when no voltage is applied in a bright environment.
Figure 4:
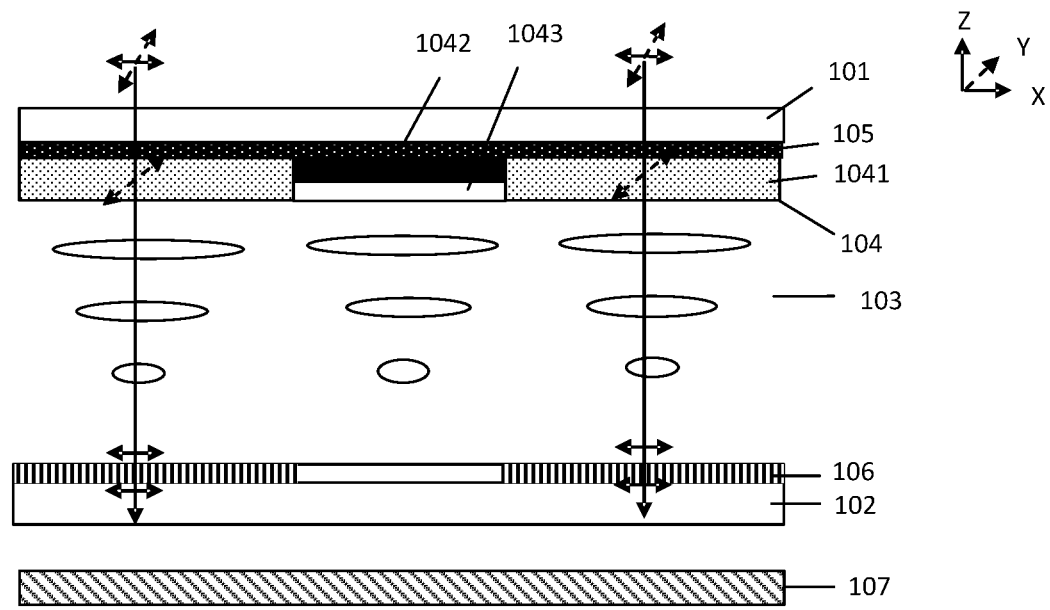
FIG. 4 schematically shows an optical path diagram of a display panel when a voltage is applied in a bright environment.
Figure 5:
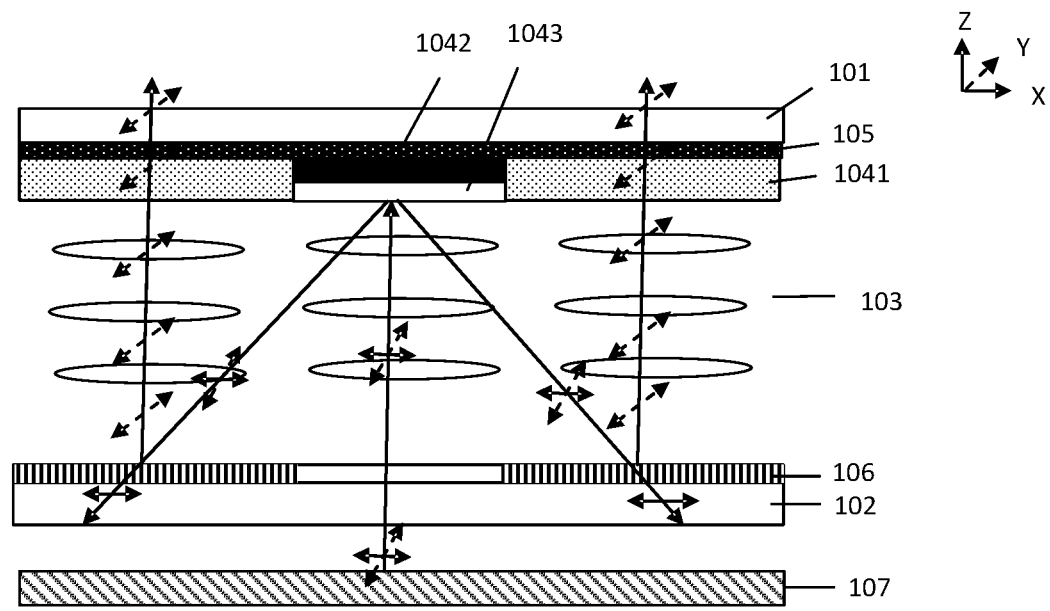
FIG. 5 schematically shows an optical path diagram of a display panel when no voltage is applied in a dark environment.
Figure 6:
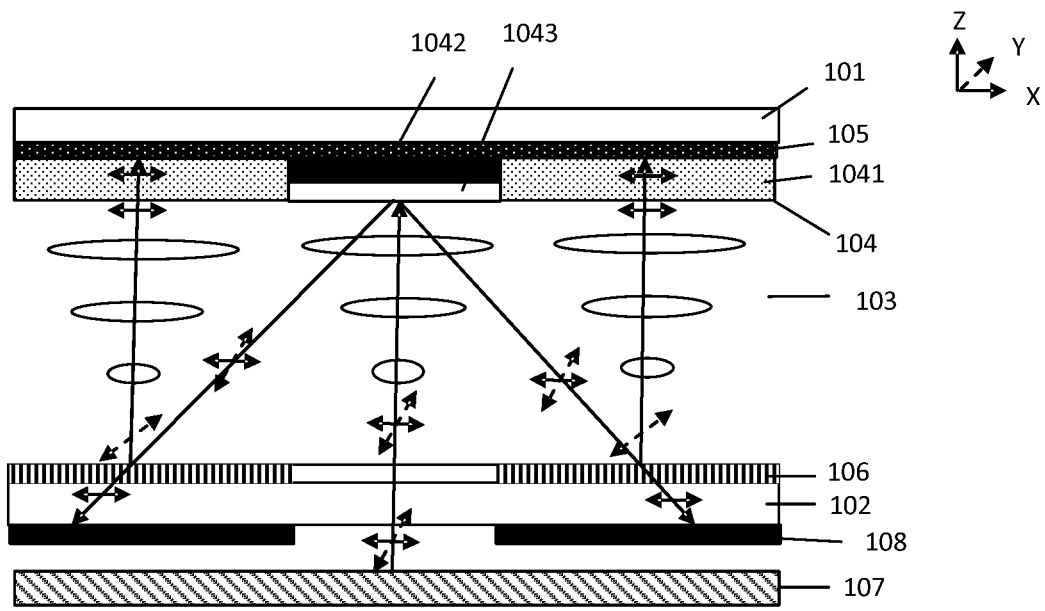
FIG. 6 schematically shows an optical path diagram of a display panel when a voltage is applied in a dark environment.

FIG. 3 schematically shows an optical path diagram of a display panel when no voltage is applied in a bright environment. FIG. 4 schematically shows an optical path diagram of a display panel when a voltage is applied in a bright environment. FIG. 5 schematically shows an optical path diagram of a display panel when no voltage is applied in a dark environment. FIG. 6 schematically shows an optical path diagram of a display panel when a voltage is applied in a dark environment.

As shown in FIG. 3, when the display panel is in a bright environment and no voltage is applied, the ambient light (natural light) will pass through the first polarizer 105 and becomes a linearly polarized light of Y-direction polarization (the Y-polarization direction is indicated by a dashed arrow). Since the voltage is not applied, the liquid crystal molecules in the liquid crystal layer 103 will not deflect, so that the polarization state of the linearly polarized light passing through will not be changed. When the linearly polarized light is transmitted through the liquid crystal layer 103 to the second polarizer 106, it is still polarized in the Y-direction. Since the light transmission axis of the second polarizer 106 is in the X-direction and can reflect the light component polarized in the direction (Y-direction) perpendicular to the transmission axis, the linearly polarized light polarized in the Y-direction will not able to pass through the second polarizer 106, but reflected by the second polarizer 106 to the liquid crystal layer 103 and transmitted from the first polarizer 105, so that the bright display can be realized.

As shown in FIG. 4, when the display panel is in a bright environment and the voltage is applied, the liquid crystal molecules in the liquid crystal layer 103 will deflect so that the polarization direction of the linearly polarized light passing through is rotated by 90 degrees to become a linearly polarized light polarized in the X-direction (indicated by double arrows of solid lines). The linearly polarized light is transmitted through the second polarizer 106 on the one side of the second substrate 102 and is absorbed by the light absorbing element 108 on the other side of the second substrate 102, so that no light is reflected on the display surface of the display panel and the dark display can be realized.

As shown in FIG. 5, when the display panel is in a dark environment and no voltage is applied, turned on the backlight source 107, a part of the light (natural light) emitted from the backlight source 107 is incident on the first reflector 1043 located on the black matrix 1042 through the notch of the second polarizer 106. The natural light is reflected by the first reflector 1043 into the surrounding liquid crystal layer 103 and is incident on the second polarizer 106 through the liquid crystal layer 103. The second polarizer 106 reflects the Y-direction light of the polarization component and transmits the X-direction light of the polarization component. The transmitted polarized light is emitted from the second substrate 102 and is absorbed by the light absorbing element 108. Since no voltage is applied, the polarized light transmitted through the liquid crystal layer 103 is not changed (still polarizes in the Y-direction) and thus the polarized light can transmit through the first polarizer 105 to realize a bright display.

As shown in FIG. 6, when the display panel is in a dark environment and the voltage is applied, turned on the backlight source 107, a part of the light (natural light) emitted from the backlight source 107 is reflected by the first reflector 105 and incident on the second polarizer 106, similarly to the case where no voltage is applied. The second polarizer 106 reflects the Y-direction light of the polarization component and transmits the X-direction light of the polarization component. The transmitted polarized light is absorbed by the light absorbing element 108. Since the voltage is applied, the liquid crystal molecules in the liquid crystal layer 103 are deflected so that the polarization direction of the reflected linearly polarized light is rotated by 90 degrees to become linearly polarized light in the X-direction. The linearly polarized light in the X-direction is not able to pass through the first polarizer 105, so that no light is emitted from the display surface of the display panel and the dark display can be realized.

As the above description, the display panel provided in accordance with the embodiments described in the present disclosure can display by utilizing ambient light in a bright environment and can display using the backlight source in a dark environment, so that the embodiments described in the present disclosure provide a display panel which can be used in any environment without the limitation of using places.

First Modified Embodiment

Figure 7:
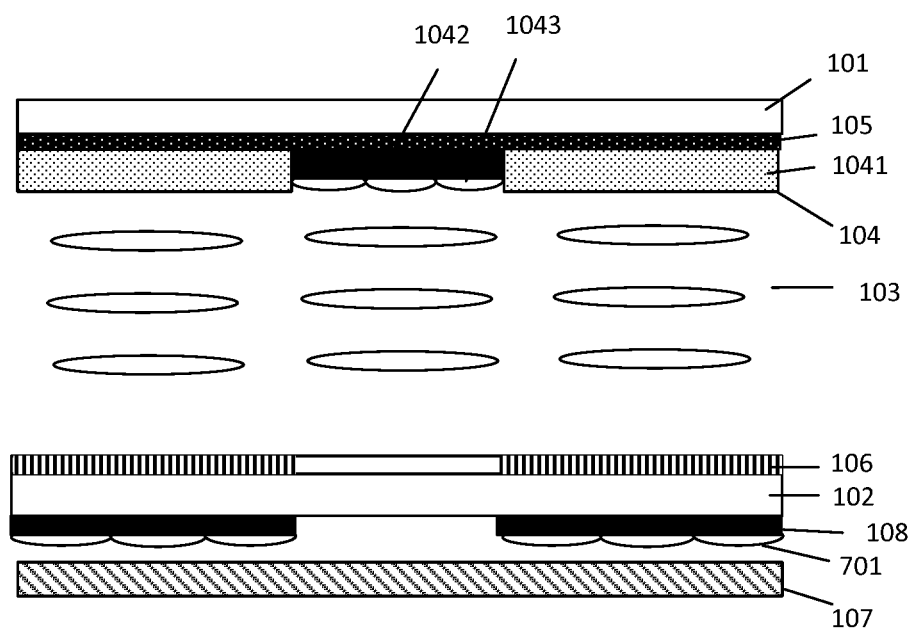
FIG. 7 schematically shows a cross-sectional view of a display panel provided by the first modified embodiment.

FIG. 7 schematically shows a cross-sectional view of a display panel provided by the first modified embodiment.

As shown in FIG. 7, a second reflector 701 can be disposed on the surface of the light absorbing element 108, which is configured to reflect the light that cannot be incident on the first reflector 1043 to the backlight source 107 to improve the utilization of the backlight source 107.

Optionally, the second reflector 701 can be made of the same material as the first reflector 1043, and the surface of the second reflector 701 can be arranged as non-planar so as to diffuse the light incident thereon in different directions. Optionally, the reflective surface shape of the second reflector 701 is the same as that of the first reflector 1043.

Second Modified Embodiment

Figure 8:
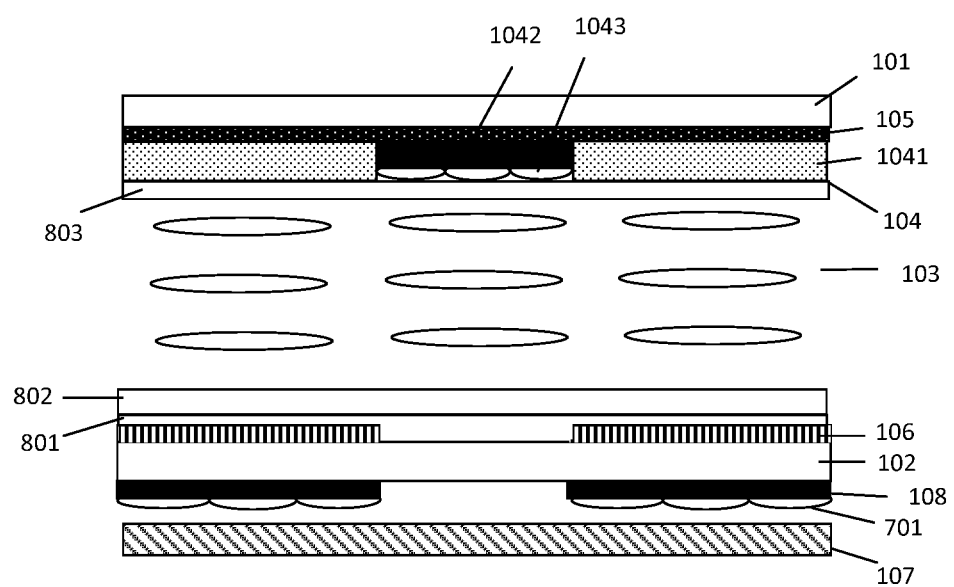
FIG. 8 schematically shows a cross-sectional view of a display panel provided by the second modified embodiment.

FIG. 8 schematically shows a cross-sectional view of a display panel provided by the second modified embodiment.

As shown in FIG. 8, the display panel 100 further includes an insulating layer 801 disposed on the second polarizer 106, and a thin film transistor array 802 disposed on the insulating layer 801. At the time of manufacturing, insulating material can be deposited on the second polarizer 106 after the formation of the second polarizer 106, so that the insulating material can fill the region of the second substrate 102 where no second polarizer 106 disposed and cover the second polarizer 106.

In an alternative embodiment, the display panel 100 further includes an overcoat 803 disposed on the side of the color film layer 104 adjacent to the liquid crystal layer 103. The overcoat 803 is configured to planarize the surface of the color film layer 104 and to protect it.

In another embodiment, the present disclosure also provides a display device comprising a display panel as previously described.

It should be noted that, the description provided herein is not intended to include all layers and/or elements that may be required by the display panel and the display device for the embodiments already described above and to the embodiments which will be further described below. More specifically, in order to simplify the description, the specific layers and/or elements commonly used by the display panel and the display device are not described here. However, those of ordinary skill in the art will readily recognize those layers and/or elements that are omitted from these general descriptions.

Methods

The embodiments of the present disclosure also provide a method of manufacturing of the display panel.

Figure 9:
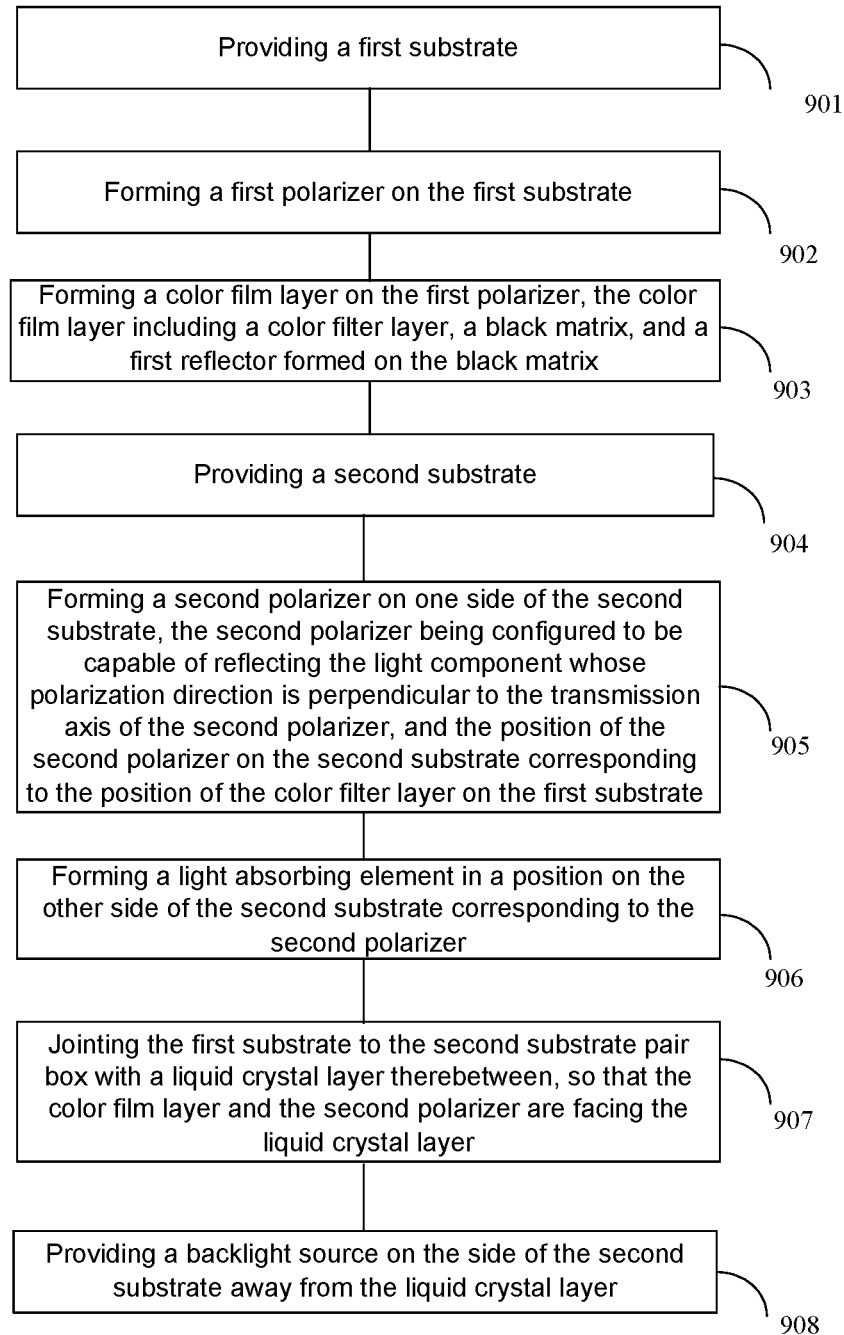
FIG. 9 schematically shows a flow chart of the manufacturing method of the display panel.

FIG. 9 schematically shows a flow chart of the manufacturing method of the display panel.

As shown in FIG. 9, the manufacturing method of the display panel comprises the steps of:

S901: Providing a first substrate.

S902: Forming a first polarizer on the first substrate.

S903: Forming a color film layer on the first polarizer, the color film layer including a color filter layer, a black matrix, and a first reflector formed on the black matrix.

S904: Providing a second substrate.

S905: Forming a second polarizer on one side of the second substrate, the second polarizer being configured to be capable of reflecting the light component whose polarization direction is perpendicular to the transmission axis of the second polarizer, and the position of the second polarizer on the second substrate corresponding to the position of the color filter layer on the first substrate.

S906: Forming a light absorbing element in a position on the other side of the second substrate corresponding to the second polarizer.

S907: Jointing the first substrate to the second substrate pair box with a liquid crystal layer therebetween, so that the color film layer and the second polarizer are facing the liquid crystal layer.

S908: Providing a backlight source on the side of the second substrate away from the liquid crystal layer.

The above steps will be further described. Since the manufacturing method provided in the present embodiment can be used to produce the display panel in the foregoing embodiments, the explanations of the same parts in the above-described embodiments are also applicable to the present embodiment, and the overlapping descriptions will be omitted in the following description.

In step S901 and step S904, the first substrate and the second substrate can be made of transparent materials, such as transparent glasses or transparent plastic.

In step S902, the first polarizer can be produced by using a thin film of polyvinyl alcohol, a polymeric compound having a web structure, as a substrate, impregnating the substrate with iodine having a strong dichroic color, reducing the substrate with a boric acid aqueous solution to achieve stability, and then stretching the same to 4 to 5 times long in one direction. After stretching, the iodine molecules are neatly adsorbed and arranged on the surface of the film, to achieve start polarizing or checking polarizing effect. The polarizer formed by this method is capable of passing one polarization component of the incident light while another polarization component is absorbed.

In step S905, the second polarizer can be produced by using below method:

1) Forming a metal film using a metal target material, and then forming a wire grid polarizer by etching process on the metal film.

Or

2) Coating a mixture layer comprising polymer monomers and metal particles on a substrate, and then patterning the mixture layer to form a wire grid polarizer.

After the formation of the first polarizer and the second polarizer, the first polarizer and the second polarizer can be respectively fixed to the first substrate and the second substrate.

In an alternative embodiment, after step S905, the method described above may further comprise: forming an insulating layer on the second polarizer, and forming a thin film transistor array on the insulating layer.

In step S903, The color filter layer and the black matrix can be produced using any process known in the art. When the first reflector is manufactured, the reflective surface of the first reflector can be configured to be capable of diffusing the reflected light at different angles. For example, a plurality of protrusions and/or depressions are disposed on the reflective surface of the first reflector, or a plurality of diffusion points formed on the reflective surface of the first reflector by a similar way with that of forming the web dot on the light guide plate of a backlight source of the prior art.

In an alternative embodiment, after step S903, the method described above can also include forming an overcoat on the color film.

In step S907, Jointing the first substrate to the second substrate together with a liquid crystal layer therebetween, wherein, the first substrate is provided with a first polarizer and a color film, and the second substrate layer provided with a second polarizer.

In an alternative embodiment, after forming the light absorbing element on the second substrate (S906), the above method may further comprise: forming a second reflector on the light absorbing element, which is configured to reflect the light emitted from the backlight source which is unable to incident on the first reflector, in order to increase the utilization of light of the backlight source.

It is to be noted that, the flowchart depicted in this disclosure is only an example. Numerous variations of the flow chart or the steps described therein may be present without departing from the spirit of the present disclosure. For example, the steps may be performed in a different order, or the steps may be added, deleted, or modified.

Unless the context expressly stated otherwise, throughout the specification and claims which follow, the singular forms of the words include plural, and vice versa. Thus, when referring to singular, the plural of the corresponding term is usually included. Similarly, the words "comprise" and "comprising" will be construed as being included and not exclusively. Likewise, the terms "comprise" and "or" should be construed as being included unless the context clearly dictates otherwise. The term "instance" is used herein, and particularly when it is located after a set of terms, the "instance" is only exemplary and illustrative and should not be regarded as exclusive or broad. The terms "first" and "second" are for the purpose of description only and are not to be construed as indicating or implicit relative importance.

The above description of the embodiments has been provided for the purpose of illustration and description. It is not intended to be exhaustive or to limit the present application. The various elements or features of a particular embodiment are not normally limited to a particular embodiment, but where appropriate, these elements and features are interchangeable and may be used in the selected embodiment, even if there is no specific presentation or description. It can also be changed in many ways. Such changes are not to be regarded as a departure from this application, and all such modifications are intended to be included within the scope of the present application.

Additional embodiments including any one of the embodiments described above may be provided by the disclosure, where one or more of its components, functionalities or structures is interchanged with, replaced by or augmented by one or more of the components, functionalities or structures of a different embodiment described above.

What is claimed is:

1. A display panel, comprising:
    a first substrate and a second substrate, which are disposed opposite to each other;
    a liquid crystal layer, which is disposed between the first substrate and the second substrate;
    a color film layer, which is disposed on the side of the first substrate adjacent to the liquid crystal layer, the color film layer including a color filter layer, a black matrix, and a first reflector disposed on the side of the black matrix adjacent to the liquid crystal layer,
    a first polarizer and a second polarizer, which are respectively disposed on the first substrate and the second substrate, the second polarizer being configured to be able to reflect the light component whose polarization direction is perpendicular to the transmission axis of the second polarizer, and the position of the second polarizer corresponding to the position of the color filter layer,
    a light absorbing element, which is disposed on the side of the second substrate away from the liquid crystal layer, the position of the light absorbing element corresponding to the position of the second polarizer, and
    a backlight source, which is disposed below the second substrate.

2. The display panel according to claim 1, wherein, the reflective surface of the first reflector is configured to be capable of diffusing the reflected light component at different angles.

3. The display panel according to claim 2, wherein, the reflective surface of the first reflector includes a plurality of protrusions, or a plurality of depressions, or both a plurality of protrusions and a plurality of depressions.

4. The display panel according to claim 1, wherein, the second polarizer is a wire grid polarizer.

5. The display panel according to claim 1, wherein, the first polarizer is located between the first substrate and the color film layer; the second polarizer is located on the side of the second substrate adjacent to the liquid crystal layer.

6. The display panel according to claim 1, wherein, the display panel further comprises a second reflector disposed on the light absorbing element.

7. The display panel according to claim 5, wherein, the display panel further comprises an insulating layer disposed on the second polarizer, and a thin film transistor array disposed on the insulating layer.

8. The display panel according to claim 1, wherein, the display panel further comprises an overcoat disposed on the side of the color film layer adjacent to the liquid crystal layer.

9. A display device, comprising a display panel according to claim 1.

10. A manufacturing method of manufacturing the display panel, comprising:
providing a first substrate,
forming a first polarizer on the first substrate,
forming a color film layer on the first polarizer, the color film layer including a color filter layer, a black matrix, and a first reflector formed on the black matrix,
providing a second substrate,
forming a second polarizer on one side of the second substrate, the second polarizer being configured to be capable of reflecting the light component whose polarization direction is perpendicular to the transmission axis of the second polarizer, and the position of the second polarizer on the second substrate corresponding to the position of the color filter layer on the first substrate,
forming a light absorbing element in a position on the other side of the second substrate corresponding to the second polarizer,
jointing the first substrate to the second substrate with a liquid crystal layer therebetween, so that the color film layer and the second polarizer are facing the liquid crystal layer, and
providing a backlight source on the side of the second substrate away from the liquid crystal layer.

11. The method according to claim 10, wherein, a reflective surface of the first reflector is configured to be capable of diffusing the reflected light component at different angles.

12. The method according to claim 11, wherein, the reflective surface of the first reflector comprises a plurality of protrusions or a plurality of depressions, or both a plurality of protrusions and a plurality of depressions.

13. The method according to claim 10, wherein, the second polarizer is a wire grid polarizer.

14. he method according to claim 10, wherein, after forming the light absorbing element, the method comprises: forming a second reflector on the light absorbing element.

15. The method according to claim 10, wherein, after forming the second polarizer, the method further comprises:
forming an insulating layer on the second polarizer, and forming a thin film transistor array on the insulating layer.

16. The method according to claim 10, wherein, after forming the color film, the method further comprises: forming an overcoat on the color film.

* * * * *